Sept. 18, 1951 R. GOURDON 2,568,616
DIFFERENTIAL ACTUATING MECHANISM FOR CALCULATING MACHINES
Filed March 16, 1946 7 Sheets-Sheet 1

Robert Gourdon
INVENTOR

By George N. Corey
His Attorney

Sept. 18, 1951 R. GOURDON 2,568,616
DIFFERENTIAL ACTUATING MECHANISM FOR CALCULATING MACHINES
Filed March 16, 1946 7 Sheets-Sheet 3

Robert Gourdon
INVENTOR
By George H. Corey
His Attorney

Sept. 18, 1951            R. GOURDON            2,568,616

DIFFERENTIAL ACTUATING MECHANISM FOR CALCULATING MACHINES

Filed March 16, 1946            7 Sheets-Sheet 5

Robert Gourdon
INVENTOR

By George H. Corey
His Attorney

Sept. 18, 1951 R. GOURDON 2,568,616
DIFFERENTIAL ACTUATING MECHANISM FOR CALCULATING MACHINES
Filed March 16, 1946 7 Sheets-Sheet 6

Robert Gourdon
INVENTOR
By George H. Corey
His Attorney

Sept. 18, 1951 R. GOURDON 2,568,616
DIFFERENTIAL ACTUATING MECHANISM FOR CALCULATING MACHINES
Filed March 16, 1946 7 Sheets-Sheet 7

Robert Gourdon
INVENTOR
By George N. Corey
His Attorney

Patented Sept. 18, 1951

2,568,616

UNITED STATES PATENT OFFICE 2,568,616

DIFFERENTIAL ACTUATING MECHANISM
FOR CALCULATING MACHINES

Robert Gourdon, Paris, France, assignor to Centre d'Etudes M. B. A. (Mecanique, Balistique, Armement), Paris, France Application March 16, 1946, Serial No. 654,836
In France February 9, 1945

Section 1, Public Law 690, August 8, 1946
Patent expires February 9, 1965

11 Claims. (Cl. 235—79)

1

This invention relates to calculating and other accounting machines, including cash registers, and more particularly to the calculating or computing mechanism proper forming the most important part of such machines.

It has for its object the provision of an improved calculating mechanism for accounting machines comprising simplified and relatively inexpensive parts which are so constructed and of such character that they do not easily get out of order.

More particularly, it is an object of the present invention to provide a differential actuating mechanism which possesses the characteristics pointed out above while being of small and compact size. My invention is further characterized by the fact that a minimum number of parts such as springs and the like are used therein which might become weak or are capable of comparatively rapid deterioration in use. It is a further object to provide a mechanism of the above character having the form of a drum with the co-operating parts enclosed therein and functioning as a controllable drive transmitting mechanism.

It is still a further object to provide a driving mechanism for a differential actuating mechanism, which is so constructed and arranged that a driven member will be rotated first in one direction and then in the opposite direction during a predetermined movement of a driving member in a single direction.

In the drawings affixed to this specification and forming part thereof an embodiment of my invention is illustrated diagrammatically by way of example.

In the drawings:

Figs. 10 to 16 are partly sectional side views

2 and Figs. 10a to 16a are corresponding partial cross sections, drawn to a larger scale, of the differential actuating means, corresponding to different operative positions.

Figures 1, 2:
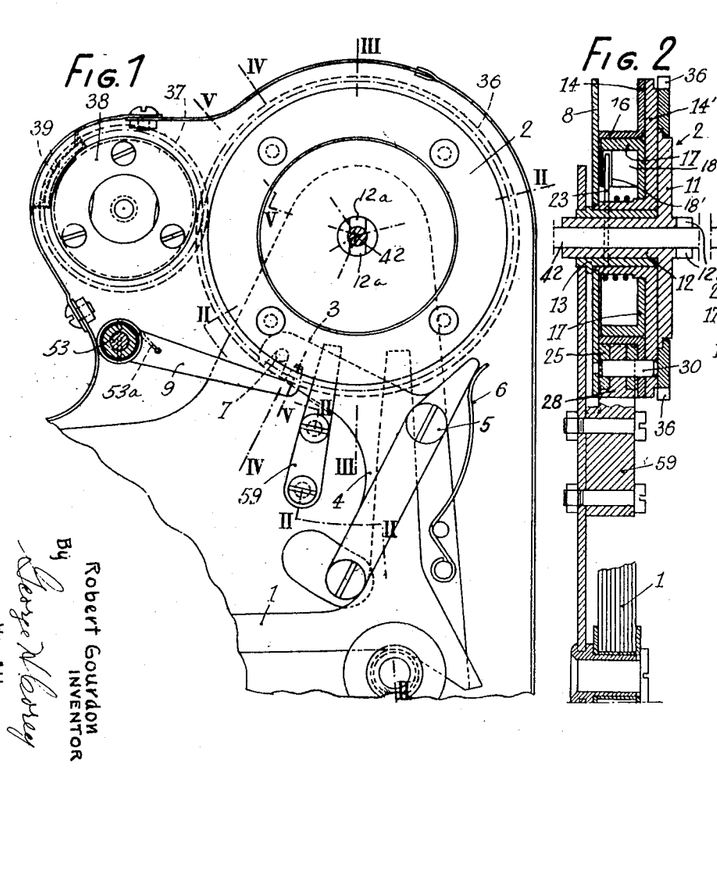
Fig. 1 is a partly sectional side-view of the differential actuating mechanism of a cash-register according to my invention.
Figs. 2–5 are cross sections on the lines II—II, III—III, IV—IV, and V—V, respectively, in Fig. 1.
Figure 3:
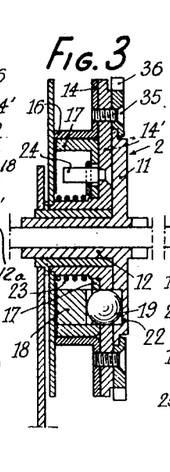
Figure 6A:
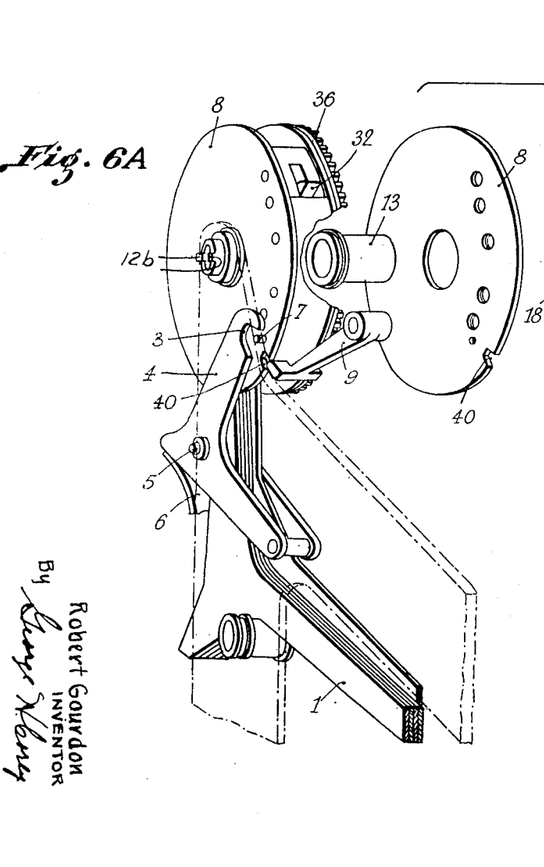
Fig. 6a is a perspective view, partly broken away, of the differential actuating mechanism.
Figure 6B:
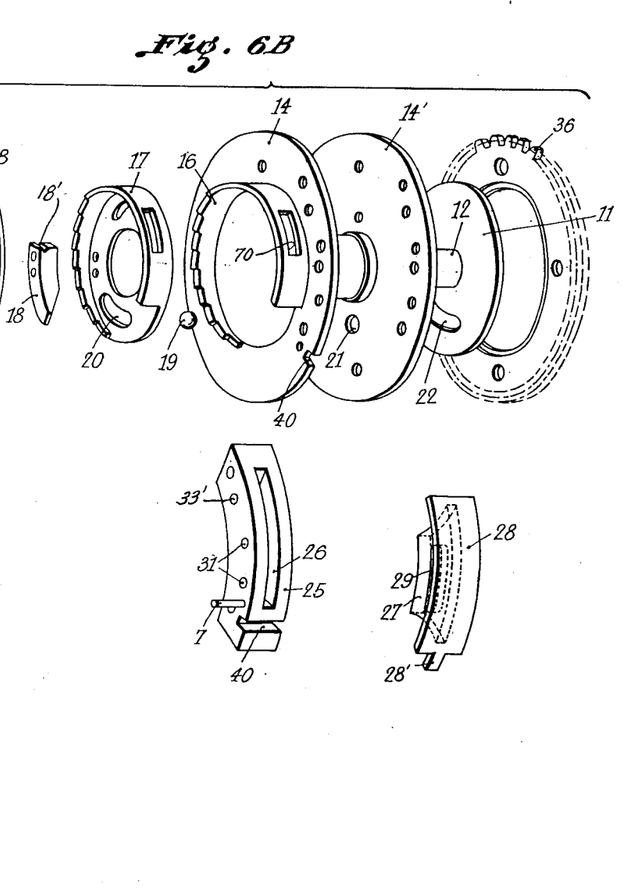
Fig. 6b is an exploded perspective view showing the several parts of the differential actuating mechanism.

As shown in Fig. 1, the accounting machine, for instance a cash register, includes packs of transmission bars 1 operated by means of the keys of a keyboard (not shown) in a manner such as disclosed in my copending U. S. applications Ser. No. 654,835, now Patent No. 2,522,671, issued September 19, 1950, and 654,837 which were filed in the U. S. Patent Office on March 16, 1946. Patent No. 2,522,617 discloses and claims key-actuated operating mechanism including the transmission bars 1 for operating a differential actuating mechanism of the type disclosed herein. Application Serial No. 654,837 discloses and claims a calculating machine comprising individually removable parallel spaced ordinal units, each unit including key-actuated operating mechanism as disclosed in Patent No. 2,522,617 and differential actuating mechanism as disclosed in the present application. When the bars 1 are raised from the positions shown in Fig. 1, their vertically extending ends cooperate with a differential actuating mechanism represented in Fig. 1 as a drum 2. The latter includes a denominationally controlled lock and release system comprising a notched arm 3 forming part of a bell crank lever 4 (Fig. 6) having one end in the form of a composite bail overlying the bars 1. The lever 4 is pivotally secured at 5 and is biased by the spring 6 into a locking position in which the notched arm 3 engages a pin 7 fixed on the rotatable disc 8 (see also Fig. 6) of the differential actuating drum. A similar denominationally controlled locking and release system is provided for each differential actuator drum of each denominational order of the values or amounts to be registered.

When a key is depressed, the corresponding transmission bar effects a pivotal movement of the bell crank lever 4, thereby moving the notched arm 3 out of engagement with the pin 7.

In addition to the several denominationally controlled locking and release systems, there exists also a second or general locking and release system controlled by the main driving mechanism and including a lever 9 provided with a projection or lip adapted to engage notches 43 (Figs. 5 and 6) in certain parts such as the disc 8 of each of the differential actuating drums.

Figure 7:
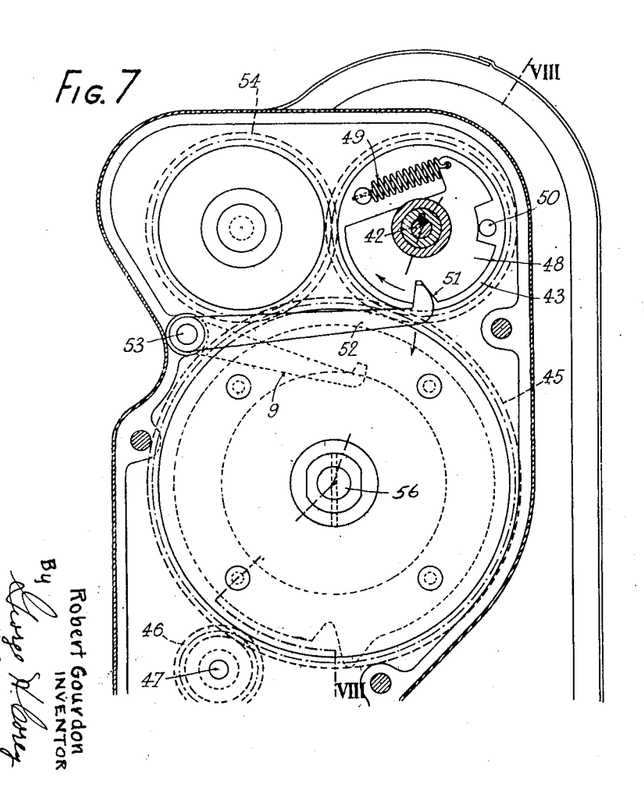
Fig. 7 is another side view, partly in section, of that part of the mechanism which drives the differential actuating drums.
Figure 9:
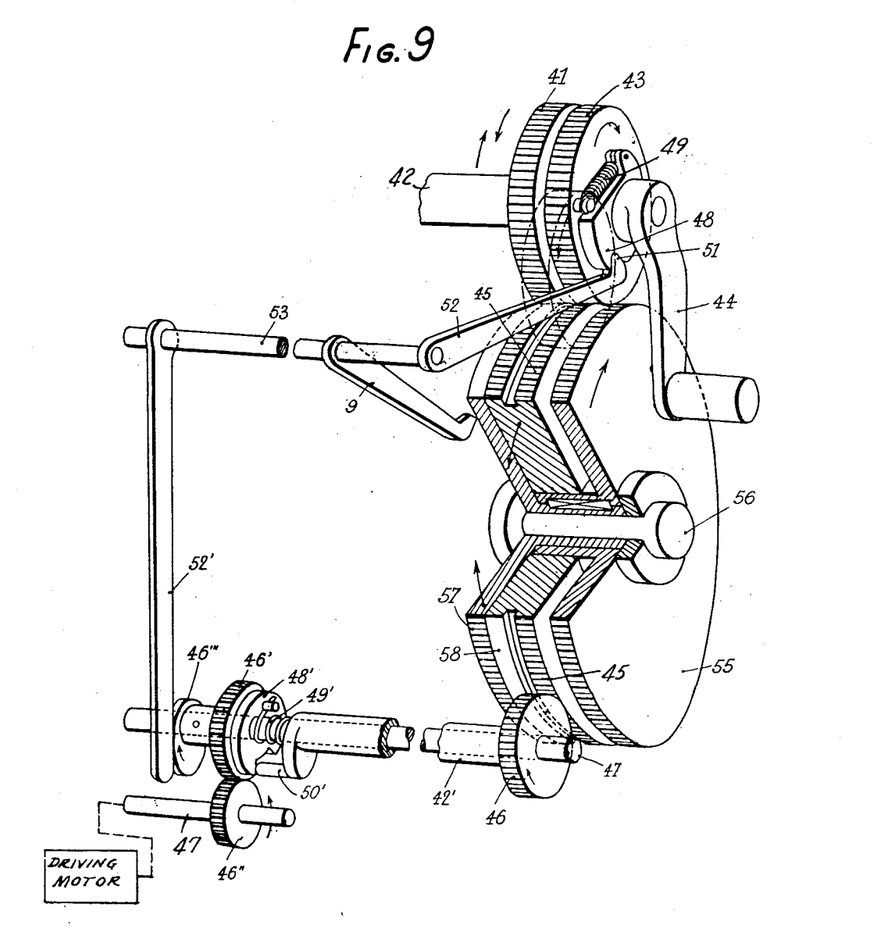
Fig. 9 is a perspective view of the mechanism illustrated in Figs. 7 and 8.

The different levers 9 corresponding to the different denominational orders are keyed to a shaft 53 shown in Figs. 1, 7 and 9, the rotation of which disengages the lips of all the levers 9 from the notches in the respective discs 8.

Shaft 53 is normally biased by a spring 53a (see Fig. 1) to hold the lips of all the levers 9 within said notches 40 and to engage other lever arms 52' and 52 (Figs. 7 and 9) secured to shaft 53 respectively with a power driven cam 46''' and a hand-operated cam 51. At the start of any single actuation of the machine from a state of rest, one of the cams, 46''' or 51, operates the shaft 53 to withdraw the levers 9 from the notches 40, as hereinafter more particularly pointed out.

The differential actuating drum proper comprises (see in particular, Figs. 2 and 6) a driving disc 11, shown as integral with a sectional hollow driving shaft 12 driven by means of an actuating mechanism operated by a crank or a motor and which will be described hereinafter.

On the hollow shaft 12 of this driving disc 11 is rotatably mounted a sleeve 13 carrying the other elements of the mechanism.

Figures 4, 5:
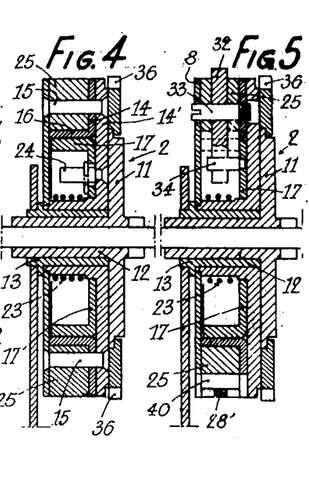

This sleeve 13 carries in particular a driven member constituted by three discs 14, 14' and 8 fixed to each other by rivets 15 (Fig. 4). To disc 14 is secured a notched part-cylindrical member 16, hereinafter referred to as the outer cylinder, whose notches correspond to the different numerals to be registered.

Inside this notched cylinder is rotatably mounted a cup-shaped locking member 17, hereinafter referred to as the inner cylinder, formed with a notched portion similar to that of cylinder 16.

Inside said cup 17 is fixed a cam member 18 adjacent which is located a ball 19 which is accommodated within a circumferentially extending slot 20 in the bottom wall of the cup 17 and also within an opening 21 in the disc 14'.

In the outer driving disc 11 is formed a cam-shaped recess 22 for at times receiving the ball 19.

Between the cup 17 and the notched cylinder 16 is arranged a spring 23 (see in particular, Fig. 2 and Figs. 10 to 16) one of its ends engaging a notch 18' in the cam member 18 (Figs. 2 and 10) while the other end engages a stud 24 secured to the disc 14' (Figs. 3 and 10 to 16).

A setting member 25 (Figs. 2, 4, 5, 6) is secured between discs 8 and 14 by rivets 15 (Fig. 4). Member 25 carries the stud 7 which passes through an opening in the disc 8 so as to appear on the outside thereof (see Fig. 6). The member 25 is formed with a slot 26 (Fig. 6) adapted to receive a tongue 27 projecting inwardly from a curved slide 28. The tongue 27 may be formed with an arcuate recess 29 (see Figs. 10 to 16) which receives guiding studs 30 mounted in openings 31 of the member 25 (see Figs. 2 to 6).

The member 25 also carries a two-armed lever 32 (Figs. 10 to 16) whose pivot pin 33 extends into ports 33' (Fig. 6) formed in the member 25. The lever 32 bears at its outer end against one end of the slide 28 (see Fig. 10) while its inner end extends through a slot 70 in the outer cylinder 16 and bears against a stud 34 fixed to the cup-shaped member 17 (see Fig. 5).

The disc 14' has a gear 36 secured to it by screws 35 (Fig. 3) this gear meshing with a gear 37 on the numeral drum 38, the numerals of which may be inspected through the window 39 (Fig. 1).

As best shown in Fig. 6, each of the different parts forming the driven member of the differential actuating drum and in particular the discs 14 and 8 and the stop member 25 are formed with a notch 40 (Fig. 12) adapted to be engaged by the locking lever 9 (Fig. 6). The end of this lever which engages the notches 40 is forked to receive a projection 28' on the slide 28 (Fig. 6).

Figure 8:
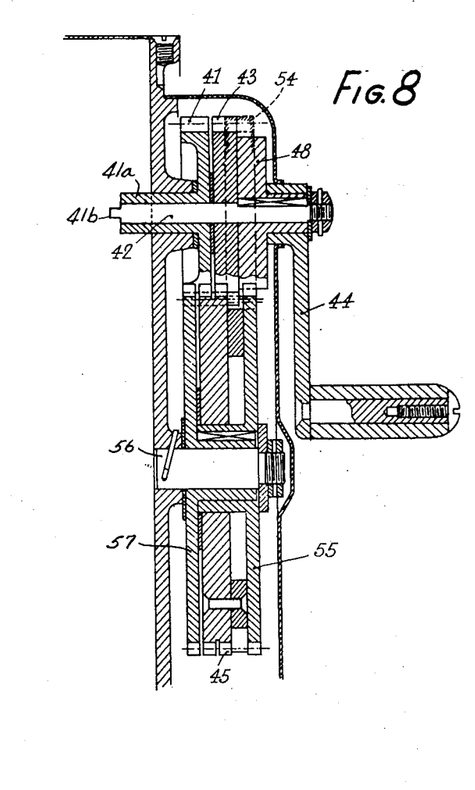
Fig. 8 is a cross-section on the line VIII—VIII in Fig. 7.

The disc 11 of each differential actuating mechanism is driven by the mechanism illustrated in Figs. 7, 8 and 9, which effects the release of the locking mechanism operated by lever arms 9 and then drives the disc 11 first through one revolution in one direction and then through one revolution in the opposite direction. The driving mechanism is so constructed that each of the several differential actuating mechanisms has a similar forward and reverse cycle of operation effected by two consecutive revolutions in the same direction of a hand crank or motor.

The sectional shafts 12 of the several differential actuating mechanisms in a machine are received on a through shaft 42 extending laterally of the machine. Each sectional shaft 12 is provided at its right end, as it appears in Fig. 2, with diametrically opposite recesses 12a, adapted to receive mating teeth 12b (Fig. 6a) which project from the left end of the next adjacent shaft. The shaft 42 rotatably carries, near its right hand end, a gear 41 (Fig. 8) having a hub 41a extending to the left and provided at its end with teeth 41b corresponding to the teeth 12b of the sectional shafts 12. When the several differential actuating mechanisms of a machine are assembled, all the teeth 12b are engaged with the adjacent notches 12a, except, of course, for the teeth on the mechanism nearest the left end of the shaft 42, and the notches on the mechanism nearest the right end of shaft 42, which notches are engaged by the teeth 41b. Hence, when the gear 41 is rotated, the sectional shafts 12 of all the differential actuating mechanisms are rotated. Adjacent the gear 41, the shaft 42 rotatably carries a gear 43. This gear 43 may be driven by means of a hand-actuated crank 44 keyed to the shaft 42 or by a gear 45 driven by a pinion 46 (Figs. 7 and 9) which may be driven by an electric motor.

The crank 44 is fixed to a notched disc 48 (Fig. 7), having a lost motion connection with gear 43 by means of a driving stud 50. A spring 49 is secured at one end to disc 48 and at its other end to the gear 43. This disc 48 is formed with a cam notch 51 engaged by the end of the lever 52' which is keyed to shaft 53 carrying the locking release levers 9.

In the case of operation by electric motor, the drive is transmitted to the shaft of the pinion 46 with some lag. The pinion 46 is loose on its shaft 47 and fixed to a hollow shaft 42' provided with a crank and crank pin 50' (Fig. 9). The pin engages a notch in a disc 48'. A spring 49' connects disc 48' to hollow shaft 42'. Disc 48' is fixed to a gear 46' engaged by a driving pinion 46'' which is driven by an electric motor. Disc 48' is also fixed to a cam 46''' driving a follower lever 52' fixed on the shaft 53 carrying the releasing levers 9.

The gear 43 meshes with a transmission gear 54 (Fig. 7) which is in mesh with a gear 55.

The gear 55 is provided with a hub concentric with and keyed to the hub of a sector gear 57 carrying teeth only on one half of its circumference. The hub of gear 57 is journaled on a stud 56. Journaled on the hub of gear 55 is a gear 45 which is fixed to another sector gear 58 also carrying teeth only on one half of its circumference.

The toothed segments of the sector gears 57 and 58 alternately mesh with the gear 41 driving the differential actuating drums, if the original positions of the toothed segments provide for such alternating engagement. In other words the toothed sectors, at the start of an actuation of the machine, are arranged to occupy the correct relative angular positions to provide alternate engagement thereof with the gear 41 to impart a forward and reverse cycle of operation to the drums.

It is apparent from the preceding disclosure that, when the crank 44 is rotated, it will first move the disc 48 keyed on the crank shaft 42 in the direction of the upper arrow in Fig. 7, whereby the end of the lever 52 is disengaged from the notch 51 of disc 48 (Figs. 7 and 9) and the lever moved in the direction of the lower arrow in Fig. 7. This movement of the lever provides for a rotation in the same direction of the levers 9 of the different differential actuating drums, all of which are released thereby. This release is effected after the releases effected by the depression of a key which leads to the raising of the corresponding transmission bar 1 and to the rocking of the lever 4 and the release of the stud 7 in the corresponding drum. The operation of the locking levers 9 is effected through cam 46''' and lever 52' if the machine is driven by an electric motor acting on the pinion 46''.

Once the lever 52 has been operated, the disc 48 by acting on the stud 50, drives the gear 43 in the direction indicated by the arrow in Fig. 9. Gear 43 meshes directly with the gear 45 and also drives the gear 55 through the gear 54. Consequently, these two gears 45 and 55 rotate in opposite directions, as illustrated by arrows in Fig. 9.

Gear 55 being fixed to the toothed sector gear 57 and gear 45 to the sector 58, these sector gears 57 and 58 also rotate in opposite directions.

The smooth and the toothed sectors of each gear 57 and 58 are arranged so that their toothed segments can alternatingly engage the gear 41. In consequence thereof, the gear 41 will rotate in opposite directions according as to whether it engages gear 57 or gear 58.

It is therefore possible, by two revolutions of the crank 44 in a given direction, indicated by the arrow in Fig. 9, to bring about sequential revolutions in opposite directions of the gear 41 and thereby of the differential actuating drums.

These two sequential revolutions in opposite directions are necessary for producing the registering operation proper on the first revolution and for returning all the parts to their starting positions on the following reverse revolution.

Figures 10, 10A, 11, 11A:
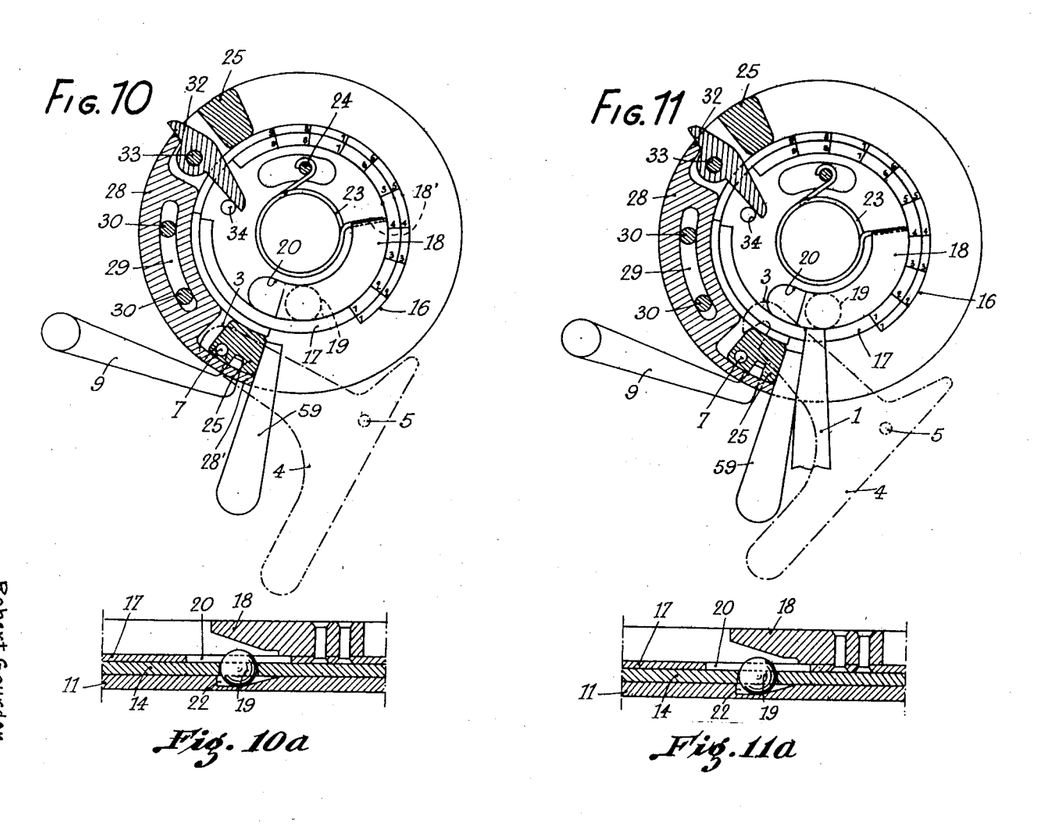

The operation of the differential actuating mechanism will now be described. The parts are shown in Figs. 1–10 in their normal rest positions. In these positions, the driven member of the differential actuating mechanism, which includes the member 25 and the discs 14, 14' and 3, is locked by the engagement of the finger at the end of arm 9 with the notches 40. This driven member is also locked by the engagement of the notch at the end of arm 3 with the pin 7. Referring to Figure 10, it may there be seen that the spring 23 is effective to bias the stud 24 and thereby the discs 14 and 14' in a counter-clockwise direction. Counter-clockwise movement of the driven member is limited by the two locking means and by the engagement of the lower end of member 25 with a fixed stop 59 which is attached to the frame of the machine. At the same time, the right end of spring 23 continues to bias the cam member 18 in a clockwise direction. The motion of cam member 18 in that direction is limited by the engagement of pin 34 with the right end of lever 32, the engagement of the left end of lever 32 with the upper end of slide 28 and the engagement of the lower end of slide 28 with the fixed stop 59. The relative position of the inner cylinder 17 with respect to the position of the disc 14' is then such, as shown in Fig. 10a, that the cam surface on the cam member 18 is spaced from the cam slot 22 formed in the driving disc 11 by a distance substantially greater than the diameter of ball 19.

Now let it be assumed that the crank 44 is actuated to operate the driving disc 11 through its usual cycle of one forward revolution and one reverse revolution, but that none of the keys is depressed in the particular denominational order whose differential actuating mechanism is illustrated. Under these conditions, the driving disc 11 may move to the position illustrated in Fig. 15a. As its cam groove 22 moves out of alignment with ball 19, the ball merely moves through the aperture in disc 14'. The disc 11 is then free to move, without carrying with it the driven member of the differential actuating mechanism. The disc 11 can consequently move through its regular cycle and transmit its motion to the other differential actuating mechanisms more remote from the crank 44, but the driven member of this particular differential actuating mechanism remains stationary.

Now let it be assumed that the key corresponding to the numeral 5 in the particular denominational order illustrated is depressed and that the crank 44 is thereafter moved through its normal cycle of two revolutions. The object of this operation is to bring the numeral 5 on the drum 38 into registry with the window 39.

When the key is depressed, the vertical extension of the transmission bar 1 corresponding to that key is moved to the position illustrated in Fig. 11. At the same time, the lever 4 is rotated clockwise from the position shown in Fig. 10 of that shown in Fig. 11, so that the pin 7 is released from the notch in the end of arm 3. At this moment, the driven member of the differential actuating mechanism is still locked by the finger on the end of arm 9. As soon as the crank 44 is turned, the arm 9 is rotated clockwise, as previously described and the driven member then becomes free to rotate. If it were not for the friction between the various parts, particularly the friction between the driven disc 14' and the driving disc 11, the spring 23 would immediately cause relative motion between the inner and outer cylinders so as to move the parts to the positions shown in Fig. 12. The friction of the parts prevents this movement, but as soon as the crank 44 is rotated further, the friction between the driving disc 11 and the driven disc 14' causes the driven disc to move slightly counter-clockwise, to the position shown in Fig. 12. During this movement, the lower end of member 25 is carried away from the stop 59, but the end of slide 28 is held in engagement with the stop 29 by the spring 23, acting through the cam member 18, inner cylinder 17, pin 34, lever 32 and slide 29. This produces a movement of the inner cylinder 17 relative to the disc 14'. Since the inwardly extending arm of lever 32 is longer than the outwardly extending arm, the inner cylinder 17 moves farther than the slide 28, and hence its angular movement is greater than that of the disc 14'. The cam member 18 moves with the inner cylinder 17 and engages the ball 19, as shown in Fig. 12a and forces it to remain in the groove 22 in the driving disc 11. The driving disc 11 and the driven disc 14' are thereby positively clutched together through the ball 19. As the further rotation of the crank 44 continues, the driving disc 11 and the driven member of the differential actuating mechanism move together. The gear 36 moves with the driven member and its motion is transmitted through gear 37 (Fig. 1) to the drum 38, thereby rotating the numeral wheel of that drum under the window 39.

Figure 13:
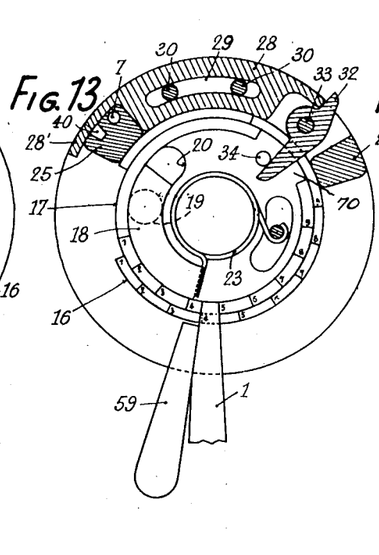
Figure 13A:
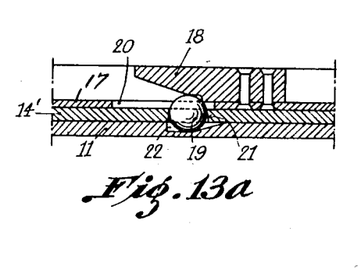
Figure 14:
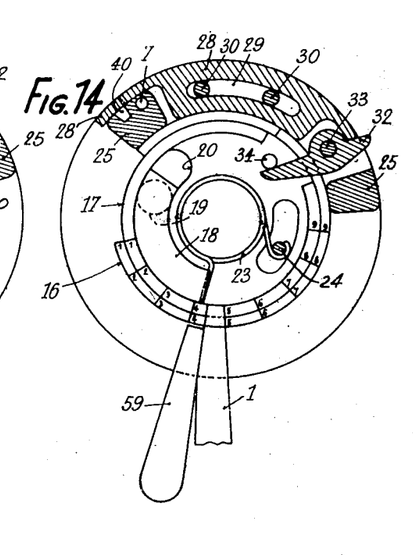
Figure 14A:
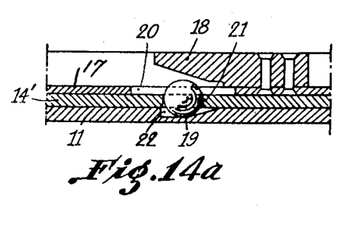

The movement just described continues until the stop numbered 5 on the inner cylinder 17 engages the end of the upward extension of transmission bar 1, as shown in Fig. 13. This prevents further clockwise movement of the inner cylinder 17. As the driving disc 11 continues to rotate, the disc 14' moving with it, carries the ball 19 away from the cam member 18, thereby releasing the positive drive between driving disc 11 and driven disc 14'. Shortly thereafter, the stop numbered 5 on the outer cylinder 16 engages the end of the transmission bar 1, so that further movement of the outer cylinder 16 and of the driven member is prevented. This position is shown in Fig. 14. The numeral drum 38 has then reached a position such that the numeral 5 is visible through window 39.

Figure 15:
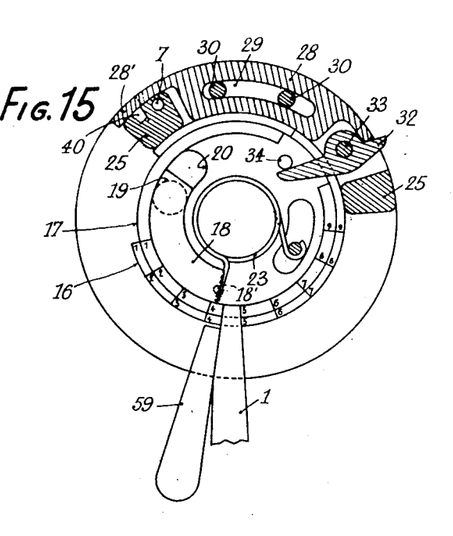
Figure 15A:
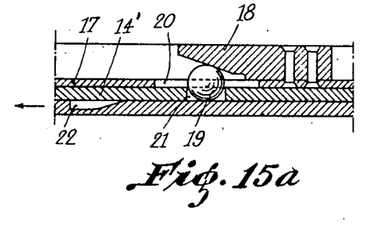
Figure 16:
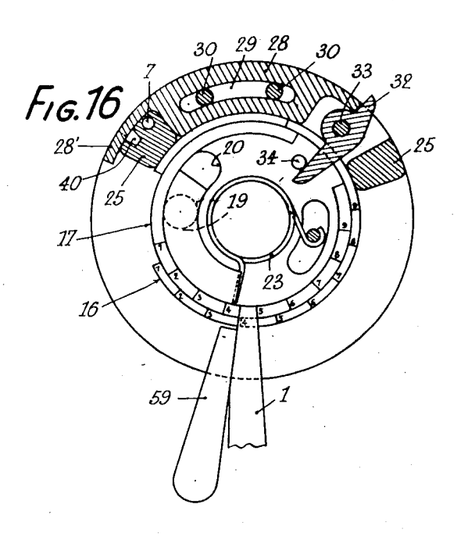
Figure 16A:
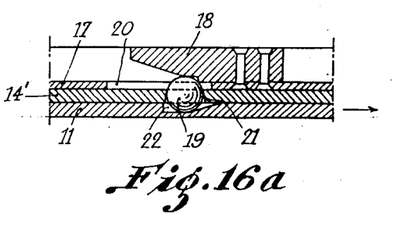

As the driving disc 11 continues to move, the ball 19 is pushed upwardly to the position shown in Fig. 15a, so that it no longer resists relative motion between the driving disc 11 and the driven disc 14. This movement of the driving disc continues until it completes its forward revolution, and then it starts its reverse travel. As soon as the reverse travel starts, the friction between driving disc 11 and driven disc 14 is sufficient to carry the cylinder 16 away from the end of bar 1. Since the cam member 18 cannot at this time move relative to the disc 14', because of the presence of the ball 19 in the position shown in Fig. 15a, the inner and outer cylinders move together until the driving disc 11 has moved far enough relative to the driven disc 14' to bring the groove 22 into alignment with the ball 19. The ball 19 then drops into the groove and allows the cam member 18 to move under the influence of spring 23 to the position shown in Fig. 16a, so that the parts are positively driven back toward their normal positions.

Figure 12:
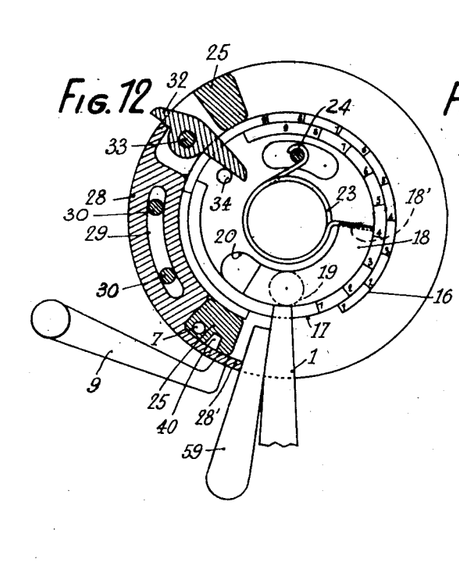
Figure 12A:
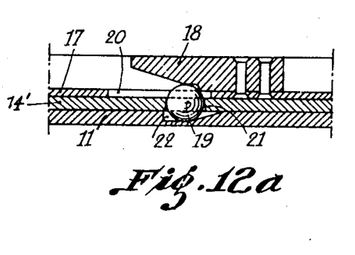

When the parts again reach the position shown in Fig. 12, the engagement of the lower end of slide 28 with the fixed stop 59 causes the slide 28 to stop as the driven member continues counter-clockwise. The lever 32 is thereby rotated clockwise and moves the pin 24 and inner cylinder 17 counter-clockwise, thereby moving the cam member 18 away from the ball 19 so that when the parts again reach the position of Fig. 11, the ball is released.

It is also apparent that the mechanism according to my invention is particularly compact and that it is driven and controlled in a very simple manner by two revolutions in the same direction of the control shaft, these revolutions being transformed automatically into two revolutions in opposite directions as required for performing on the one hand the composition of the value predetermined by the depressed key and on the other hand for returning the mechanism to zero.

Of course, the mechanism above described and illustrated in the drawings, has been disclosed merely by way of example and may be modified as to all details without the general economy of my invention being affected thereby.

Thus, for instance, the mechanism for transforming the movement, as described and illustrated, may be replaced, if desired, by any equivalent means capable of transforming two revolutions of a controlling part in one direction into two revolutions in opposite directions of the controlled part.

Similarly, certain elements of the composing and analysing mechanism which were shown as being formed of different parts, may if required be replaced in certain cases by a single part. The embodiment here disclosed however offers the advantage of allowing the use of stamped or cut sheet metal parts which can easily be assembled by means of screws or rivets.

Furthermore, the arrangement described and illustrated, although being particularly applicable to a differential actuating device for composing values or amounts in cash registers, is adaptable with a few modifications to other accounting machines provided also for the composition, by means of suitable mechanism, of predetermined values determined by a system of keys or the like.

What I claim is:

1. In a calculating machine, a shaft, a differential actuating mechanism on said shaft and operable thereby, a driving element having a lost motion connection with said shaft, cam means integral with said driving element for concurrent movement therewith, a follower for said cam means, a locking arm operatively connected to the follower for locking said differential actuating mechanism, said cam means and said follower being effective upon initial movement of said driving element to move the locking arm and release said differential actuating mechanism, said driving element being effective upon continued movement thereof to drive said shaft.

2. In a calculating machine, a driving shaft, a first gear on said driving shaft, a second gear meshing with said first gear, a first sector gear fixed to said second gear, an idler gear also meshing with said first gear, a third gear meshing with said idler gear, a second sector gear fixed to said third gear, said sector gears being rotatable about the same axis and being driven in opposite directions by rotation of said driving shaft, a driven shaft, a driven gear on said driven shaft and meshing with said sector gears, the relative angular positions of said sector gears with respect to said driven gear being such that the driven gear meshes first with one of said sector gears and is driven in one direction and then meshes with the other sector gear and is driven in the reverse direction, and a differential actuating mechanism on said driven shaft and operable thereby.

3. A calculating machine as in claim 2, including a driving element having a lost motion connection with said first gear, cam means integral with said driving element for concurrent movement therewith, a follower for said cam means, a locking arm operatively connected to the follower for locking said differential actuating mechanism, said cam means and said follower being effective upon initial movement of said driving element to move the locking arm and release said differential actuating mechanism, said driving element being effective upon continued movement thereof to drive said driving shaft and thereby operate said differential actuating mechanism.

4. In a calculating machine or the like, a shaft, a plurality of differential actuating mechanisms on said shaft and operable thereby, a driving element having a lost motion connection with said shaft, cam means integral with said driving element for concurrent movement therewith, a follower for said cam means, a plurality of locking arms operatively connected to the follower for respectively locking said differential actuating mechanisms, said cam means and said follower being effective upon initial movement of said driving element to move the locking arms to released positions, said driving element being effective upon continued movement thereof to drive said shaft, a plurality of denominational series of keys for respectively controlling said differential actuating mechanisms, a second locking arm for each of said mechanisms, and means effective upon operation of any of its associated keys for moving said second locking arm to released position.

5. Differential actuating mechanism for a keyboard controlled calculating machine, comprising a drive shaft, a driving member fixed on said shaft, a driven member having a slip-friction connection with said driving member, a lock for said driven member, clutch means for providing a positive driving connection between the driving member and the driven member, clutch engaging means mounted on the driven member for limited relative motion with respect thereto, means biasing the clutch engaging means toward a clutch engaged position, a fixed stop engageable by and limiting the movement of the clutch engaging means and the driven member in normal position, said stop being effective when engaging the driven member to hold the clutch engaging means in its clutch released position against the action of said biasing means, a series of key-actuated stops movable between retracted positions and active positions, each of said key-actuated stops being effective when in its active position to engage the clutch engaging means and the driven member in a selectively different angular position thereof, means effective upon movement of any one of said key-actuated stops to its active position to release said lock, said slip-friction connection being effective when said lock is released and said driving member is actuated to move said driven member away from said fixed stop, whereupon said biasing means operates the clutch engaging means to engage the clutch so that the driven member is positively driven through the clutch until said clutch engaging means engages said one stop, whereupon said clutch is disengaged and said driven member is then stopped in the angular position determined by said one stop, means for driving said shaft alternately through a forward revolution to drive said driven member from its normal position to a position selected by one of said key-actuated stops and then through a reverse revolution to restore the driven member to its normal position, and means movable concurrently with said driven member for actuating a registering mechanism.

6. Differential actuating mechanism for a keyboard controlled calculating machine, comprising a drive shaft, a driving disc fixed on said shaft, a driven disc loose on said shaft and having a slip-friction connection with said driving disc, a lock for said driven disc, clutch means including a ball retained in an aperture in said driven disc, and a cam groove on the driving disc for engaging the ball, a clutch engaging cam member, a cup-shaped member mounted on the driven disc for limited relative motion with respect thereto and carrying said cam member, means biasing the cup-shaped member toward a position in which the cam member forces the ball into the cam groove to cause engagement of the clutch means, a slide element mounted for limited movement with respect to said driven disc and mechanically connected to the cup-shaped member, a fixed stop against which said slide element and a part of the driven disc abut when in their starting position, said stop being then effective to hold the clutch engaging cam member in a clutch released position, a series of steps in the cylindrical wall of the cup-shaped member, a concentric cylindrical wall attached to the driven disc and having a corresponding series of steps, the steps of the first named series being in advance of the steps of the second named series when the clutch is engaged, a series of key-actuated stops movable between retracted positions and active positions corresponding to both said series of steps, means effective upon movement of any one of said key-actuated stops to its active position to release said lock, said slip-friction connection being effective when said lock is released and said driving disc is actuated to move said driven disc away from said fixed stop, whereupon said biasing means operates the clutch engaging cam member to engage the ball and positively hold it in the cam groove so that the driven disc is positively driven through the clutch until the step on said cup-shaped member corresponding to said one stop engages said one stop, whereupon said clutch is disengaged, and thereafter the corresponding step on the driven cylindrical wall engages said one stop, thereby stopping said driven disc in an angular position determined by said one stop, means for driving said shaft alternately through a forward revolution to drive said driven disc from its normal position to a position selected by one of said key-actuated stops and then through a reverse revolution to restore the driven disc to its starting position, and means movable concurrently with said driven disc for actuating a registering mechanism.

7. In an accounting machine comprising a numeral wheel and a keyboard, improved differential actuating mechanism controlled by the keyboard and arranged to act on said wheel, said differential actuating mechanism comprising a driving disc formed with a cam groove and a driven member including two discs arranged in spaced relation to form a drum and an outer stepped cylinder within said drum, one of the discs of the driven member having a slip-friction connection with the driving member, an inner stepped cylinder concentrically fitting in said outer cylinder and arranged for limited relative movement with respect thereto, a cam member fixed in the inner cylinder and adapted to register with the cam groove in said driving disc, a ball inserted between and contacting the bottom of said cam groove and said cam member and extending through a closely fitting aperture in one of said drum discs, a spring having one end fixed to the outer cylinder and the other end bearing against a part of said inner cylinder and biasing said inner cylinder toward a position wherein its steps are in advance of the steps on the outer cylinder and said cam member holds the ball tightly in the groove and thereby establishes a positive driving connection between the driving disc and the driven member, means for rotating said driving disc, a series of key-set stops selectively movable between retracted positions and active positions corresponding to both said series of steps, each stop being effective upon rotation of said driving disc while the stop is in its active position to engage corresponding steps on said outer and inner cylinders and thereby limit rotation of the driven member, said stop being effective upon continued rotation of the driven member after the stop engages the step on the inner cylinder to cause relative movement of the inner and outer cylinders until their steps are aligned, said cam member being operated by said relative movement to release said ball from the groove and thereby release said positive driving connection, and means including a gear on said driven member for driving said numeral wheel through a distance determined by the selection of one of said stops.

8. The combination of claim 7, including a guide member fixed to and extending circumferentially between the two discs of the driven member and outside of the outer cylinder, said guide member having a slot extending parallel to said discs, an arcuate slide member slidable through a limited distance along the periphery of the guide member, said slide member having a tongue projecting into said slot and guided thereby, a bearing pin fixed to the inner cylinder, a double-armed lever pivoted on the driven member and having one arm engaging one end of the slide member and the other arm extending radially through the two cylinders and engaging the bearing pin and a fixed stop adapted to engage the other end of the slide member and one end of the guide member when the differential actuating mechanism is in its starting position and thereby position said inner cylinder relative to said outer cylinder so that their steps are aligned and said positive driving connection is released.

9. The combination of claim 7, including a locking pin on the driven member, a locking lever engageable with said pin, a spring biasing the lever toward a position in which it engages the locking pin and thereby locks the driven member, and means effective upon movement of any one of said key-set stops to its active position to move the locking lever to release the locking pin.

10. A differential actuating mechanism for a keyboard controlled calculating machine, comprising a rotary driving member, a rotary driven member, a fixed stop for limiting one end of the travel of the driven member, means including a series of key-set stops for selectively limiting the other end of the travel of the driven member at different angular positions, a clutch for connecting the driving member to the driven member; clutch engaging means including means biasing said clutch engaging means toward a position in which the clutch is engaged, means carried by and movable on the driven member for engaging any of said stops just prior to engagement thereof by the driven member, said stop engaging means being effective to cause operation of the clutch engaging means to disengage the clutch as the driven member is stopped by said stops; mechanism for rotating said driving member first in one direction and then in the reverse direction, said rotating mechanism comprising a first gear, means for driving said first gear, a first sector gear driven by said first gear in one direction, a second sector gear driven by said first gear in the opposite direction, said sector gears being rotatable about the same axis, a driven shaft, a driven gear on said driven shaft and meshing with said sector gears, the relative angular positions of said sector gears with respect to said driven gear being such that the driven gear meshes first with one of said sector gears and then with the other sector gear, and a connection between said driven shaft and said driving member.

11. Differential actuating mechanism for a keyboard controlled calculating machine, comprising a rotary driving member, a rotary driven member including a first cylinder having a series of peripheral steps, a fixed stop for limiting one end of the travel of the driven member, means including a series of key-set stops corresponding in number and position to said cylinder steps for selectively limiting the other end of the travel of the driven member at different angular positions, a clutch for connecting the driving member to the driven member; clutch engaging means including a second cylinder concentric with said first cylinder and having a similar series of steps, means biasing said clutch engaging means toward a position in which the clutch is engaged and the steps on said second cylinder are slightly in advance of the steps on said first cylinder, each of said second cylinder steps being effective to engage one of said stops just prior to engagement thereof by the corresponding step of said driven member, said stop being effective when so engaged and upon continued movement of the driven member to cause relative movement of said second cylinder with respect to said first cylinder against said biasing means to disengage the clutch as the driven member is stopped by said stop.

ROBERT GOURDON.

REFERENCES CITED

The following references are of record in the file of this patent:

UNITED STATES PATENTS

| Number | Name | Date |
|---|---|---|
| 961,806 | Sears | June 21, 1910 |
| 1,109,471 | Schaller | Sept. 1, 1914 |
| 1,274,365 | Barnard | Aug. 6, 1918 |
| 2,176,561 | Placke | Oct. 17, 1939 |
| 2,387,870 | Avery | Oct. 30, 1945 |

FOREIGN PATENTS

| Number | Country | Date |
|---|---|---|
| 446,388 | Great Britain | Apr. 27, 1936 |